United States Patent [19]

Kuo et al.

[11] Patent Number: 5,770,268

[45] Date of Patent: Jun. 23, 1998

[54] CORROSION-RESISTANT COATING COMPOSITION HAVING HIGH SOLIDS CONTENT

[75] Inventors: Ming C. Kuo, Fox Point, Wis.; Staer S. Kirsten, Copenhagen, Denmark; Gary W. Marshall, Advance, N.C.

[73] Assignee: R.J. Tower Corporation, Grand Rapids, Mich.

[21] Appl. No.: 582,683

[22] Filed: Jan. 4, 1996

Related U.S. Application Data

[63] Continuation-in-part of Ser. No. 375,030, Jan. 19, 1995, Pat. No. 5,576,371.

[51] Int. Cl.⁶ ........................................... B05D 1/18
[52] U.S. Cl. .......................... 427/386; 427/435; 525/411; 525/415; 525/438; 525/523
[58] Field of Search ...................... 427/386, 435; 525/411, 438, 415, 523

[56] References Cited

U.S. PATENT DOCUMENTS

| 5,087,286 | 2/1992 | Fukuda et al. | 106/287 |
| 5,227,243 | 7/1993 | Shalati | 525/438 |
| 5,330,850 | 7/1994 | Suzuki et al. | 428/623 |
| 5,362,519 | 11/1994 | Argyropoulos | 427/385 |

*Primary Examiner*—Patricia A. Short
*Attorney, Agent, or Firm*—Janal M. Kalis

[57] ABSTRACT

A coating composition for preventing corrosion of a substrate including corrodable material, the coating composition comprising: a cycloaliphatic epoxy compound; a polyester compound; and a catalyst.

33 Claims, 1 Drawing Sheet

CORROSION-RESISTANT COATING COMPOSITION HAVING HIGH SOLIDS CONTENT

This application is a continuation-in-part of application Ser. No. 08/375,030 filed Jan. 19, 1995, now U.S. Pat. No. 5,576,371.

BACKGROUND OF THE INVENTION

1. Field of the Invention

The invention relates to coatings for preventing corrosion of carbon steel motor vehicle frame members and the like.

2. Discussion of Prior Art

Motor vehicle frame members typically consist of a substrate of corrodable material such as carbon steel. Since the frame members are exposed to a corrosive environment, the carbon steel substrate is coated with a composition which prevents or resists corrosion of the carbon steel. In order to prevent or resist corrosion, the coating must be resistant to moisture. The coating composition should also be suitable for application to the carbon steel substrate in an inexpensive, high rate production process, and in particular should be suitable for application by dipping the carbon steel member in the composition.

Wax-based compositions are resistant to moisture and corrosion and can be applied by dipping the carbon steel member therein, and thus are typically utilized to form such corrosion resistant coatings. Typically, the wax-based composition is applied in a thickness of about 4 mils by dipping the carbon steel substrate in the heat-melted liquid composition and then permitting the coated substrate to cool and form a solid coating.

SUMMARY OF THE INVENTION

Coatings of wax-based compositions typically are soft and can be inadvertently scraped off the substrate, and are susceptible to chipping and cracking upon impact with road debris such as gravel. Coatings of wax-based compositions may even further soften during periods of hot weather.

Other coating compositions typically include one or more volatile organic compounds. When the composition is applied and cured, the volatile organic compounds vaporize and are emitted into the air. Thus, the air must be treated to remove or destroy the volatile organic compounds.

Other coating compositions also typically include one or more heavy metals such as lead or chromium, and unused portions of the composition must be disposed of or recycled in a manner preventing environmental contamination by the heavy metals.

Other coating compositions typically have a short pot-life or are otherwise unsuitable for application in a high rate production process. The coating composition should have a potlife of several years, preferably at least about 5 or 10 years or more, in order to minimize material costs. This is particularly necessary when coating assembled motor vehicle frames, because a constant volume of about 50,000 gallons of the coating composition is required. The coating composition must also be curable within a relatively short period, such as about 20 minutes or less, and preferably about 5 minutes or less. Further, the coating composition must be "forgiving" in that it must form a suitable coating even when the substrate includes spots of oil, rust, weld seams, weld splatter and the like. Further, particularly in assembled motor vehicle frames, the frame members are typically fastened together in overlapping fashion such that opposed surfaces of the frame members are spaced only very slightly apart in the region of overlap, and the coating composition must form a suitable coating over these surfaces in order to prevent corrosion in the region of overlap.

A corrosion resistant coating may be exposed to elevated temperatures, especially in the vicinity of the engine of a motor vehicle, and thus should be stable upon exposure to elevated temperatures.

A corrosion resistant coating may be exposed to different weather conditions, and thus should be stable upon exposure to different weather conditions.

The invention provides a corrosion resistant composition which can be applied in a high rate production process by dipping the substrate therein. The composition has a 100% solids content and thus does not include volatile organic compounds. The composition also does not include heavy metals. The composition forms a coating which is hard, impact resistant and stable upon exposure to elevated temperatures and different weather conditions.

More particularly, the invention provides a coated member including a substrate of corrodable material such as carbon steel and a coating of a composition which prevents corrosion of the corrodable material. In one embodiment, the composition includes a cycloaliphatic epoxy compound, polyester compounds, a functional polyol and a catalyst. The composition may also include an adhesion promoter, pigment, a corrosion inhibitor, a flow agent, an anti-sag agent and a defoamer.

The composition includes from about 35% to about 80% by weight of a cycloaliphatic epoxy compound, such as 3,4 epoxycyclohexymethyl-3,4 epoxycyclohexane-carboxylate. The composition also includes from about 5% to about 40% of polyester compounds, preferably in the form of powder. The composition includes from about 5% to about 40% by weight of a functional polyol compound, such as polycaprolactone diol. The composition also includes from about 0.1% to about 2% by weight of a catalyst, such as a triflic acid. In one embodiment, the triflic acid is the diethylammonium salt of trifluoromethanesulfonic acid $(CF_3SO_3H \cdot HN(C_2H_5)_2)$.

The composition can include from about 0.1% to about 5% by weight of an adhesion promoter, such as a titanate compound. The composition can also include from about 1% to about 5% by weight of a pigment, such as carbon black. The composition can also include from about 5% to about 50% by weight of a corrosion inhibitor, such as a mixture of iron phosphide ($Fe_2P$) and iron silicide (FeSi). The composition 14 can also include from about 0.01% to about 2% by weight of a flow agents, such as a siloxane. The composition can include from about 0.25% to about 10% by weight of an anti-sag agent, such as a high hydroxy-containing compound. The composition can also include from about 0.05% to about 5% by weight of a defoamer, such as a siloxane.

The composition can be applied to the carbon steel substrate in any suitable manner, such as by dipping the substrate into the liquid composition. The composition includes no volatile organic compounds, and thus does not emit volatile organic compounds into the air. The composition also does not include heavy metals.

The dipped substrate is removed from the composition and heated at an elevated temperature to cure the composition. The coating of the cured composition is resistant to moisture, is hard, is impact resistant and is stable upon exposure to high temperatures and different weather conditions.

The invention also provides, in an alternative embodiment, a coating composition which includes a cycloaliphatic epoxy compound, a functional polyol and a catalyst. The composition in this alternative embodiment differs from the earlier-described composition in that it does not include a polyester compound.

The invention also provides, in another alternative embodiment, a coating composition which includes a cycloaliphatic epoxy compound, a functional polyol and a catalyst. The composition in this alternative embodiment differs from the earlier-described compositions in that the catalyst is a lithium salt.

Other features of and advantages of the invention will become apparent to those skilled in the art upon review of the following detailed description, claims, and drawings.

Figure 1:
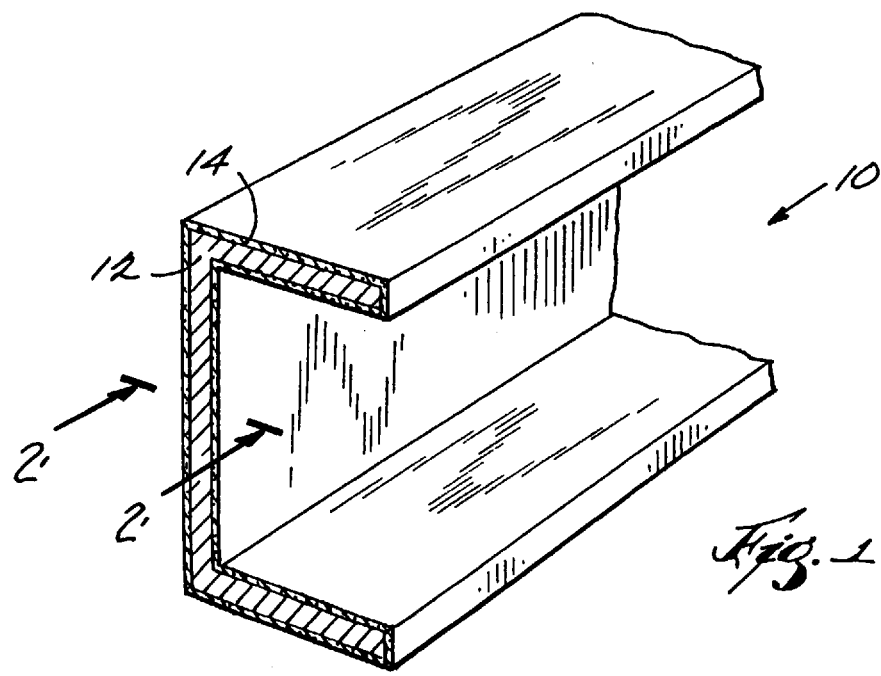
FIG. 1 is a partial perspective view of a coated vehicle frame member embodying various features of the invention.
Figure 2:
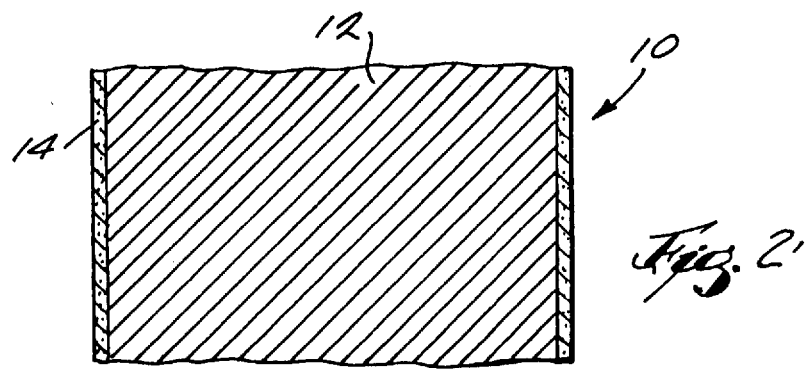
FIG. 2 is a cross sectional view taken along line 2—2 in FIG. 1.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

Illustrated in FIG. 1 is a coated member 10 embodying various features of the invention. Although coated members embodying the invention can be used in a variety of applications, in the illustrated embodiment the member 10 is a motor vehicle frame member. The member 10 includes a substrate 12 of corrodable material such as carbon steel. The member 10 also includes an outer coating of a composition 14. The composition 14 is resistant to moisture and prevents corrosion of the corrodable material 12.

The composition 14 is the cured reaction product of a cycloaliphatic epoxy compound, polyester compounds, a functional polyol and a catalyst. The composition may also include an adhesion promoter, pigment, a corrosion inhibitor, a flow agent, an anti-sag agent and a defoamer. In one embodiment, the composition is the cured reaction product of a cycloaliphatic epoxy compound, polyester compounds, a functional polyol, a catalyst, an adhesion promoter, pigment, a corrosion inhibitor, a flow agent, an anti-sag agent and a defoamer.

The composition 14 includes from about 35% to about 80% by weight of a cycloaliphatic epoxy compound, based upon the total weight of the composition. In one embodiment, the composition includes about 64% of a cycloaliphatic epoxy compound. In one embodiment, the cycloaliphatic epoxy compound is 3,4 epoxycyclohexymethyl-3,4 epoxycyclohexane-carboxylate. A suitable commercially available product is ERL 4221 (Union Carbide; Danbury, Conn.). In other embodiments, different cycloaliphatic epoxy compounds can be used. Preferably, the composition includes about 64% of 3,4 epoxycyclohexymethyl-3,4 epoxycyclohexane-carboxylate.

The composition 14 includes from about 5% to about 40% by weight of polyester compounds, based upon the total weight of the composition. In one embodiment, the composition includes about 5% of polyester compounds. In one embodiment, the polyester compounds are in the form of a non-volatile liquid. Preferably, the polyester compounds are in the form of powder. A suitable commercially available product is Reichhold 8076 Fineclad® (Reichhold; Triangle Park, N.C.). Reichhold 8076 Fineclad® is a mixture of polyester compounds in the form of powder. The mixture of polyester compounds in Reichhold 8076 Fineclad® has an average molecular weight of about 14,000 and includes hydroxy functional groups. Most preferably, the composition includes about 5% of Reichhold 8076 Fineclad®.

The composition 14 includes from about 5% to about 40% by weight of a functional polyol compound, based upon the total weight of the composition. In one embodiment, the composition includes about 16% of a functional polyol compound. Preferably, the functional polyol compound is di-functional or tri-functional. More preferably, the functional polyol compound is polycaprolactone diol. A suitable commercially available product is Tone-0201® (Union Carbide; Danbury, Conn.). More preferably, the composition includes about 16% of polycaprolactone diol.

The composition 14 includes from about 0.1% to about 2% by weight of a catalyst, based upon the total weight of the composition. In one embodiment, the composition includes about 0.3% of a catalyst. Preferably, the catalyst is a triflic acid. More preferably, the triflic acid is the diethylammonium salt of trifluoromethanesulfonic acid $(CF_3SO_3H \cdot HN(C_2H_5)_2$. A suitable commercially available product is FC 520 (Minnesota Mining and Manufacturing; Minneapolis, Minn.). Most preferably, the composition includes about 0.3% of the diethylammonium salt of trifluoromethanesulfonic acid $(CF_3SO_3H \cdot HN(C_2H_5)_2$.

The composition 14 includes from about 0.1% to about 5% by weight of an adhesion promoter, based upon the total weight of the composition. In one embodiment, the composition includes about 0.5% of an adhesion promoter. Preferably, the adhesion promoter is a titanate compound. More preferably, the titanate compound is titanium N tetrakio-(bis 2-tropenolatomethyl)-1-butanolato adduct (2 moles) di-tridecycl hydrogen phosphate. A suitable commercially available product is KR 55® (Kenrich Petrochemicals; Bayonne, N.J.). Most preferably, the composition includes about 0.5% of Kr 55®.

The composition 14 includes from about 1% to about 5% by weight of a pigment, based upon the total weight of the composition. In one embodiment, the composition includes about 2% of pigment. Preferably, the pigment is carbon black. More preferably, the carbon black is Special Black 100 (Degussa; Frankfurt, Germany). Most preferably, the composition includes about 2.1% of Special Black 100.

The composition 14 includes from about 5% to about 50% by weight of a corrosion inhibitor, based upon the total weight of the composition. In one embodiment, the composition includes about 10% of a corrosion inhibitor. Preferably, the corrosion inhibitor is Ferrophos® (Occidental Chemical; Dallas, Tex.). Ferrophos® includes iron phosphide ($Fe_2P$) and iron silicide (FeSi). More preferably, the composition includes about 9.7% of Ferrophos®.

The composition 14 includes from about 0.01% to about 2% by weight of a flow agent, based upon the total weight of the composition. In one embodiment, the composition includes about 0.1% of a flow agent. As used herein, "flow agent" means a suitable surface wetting or leveling agent. Preferably, the flow agent is a siloxane. More preferably, the siloxane is polyester modified dimethyl polysiloxane. A suitable commercially available product is Byk 310® (Byk Chemie; Wallingford, Conn.). Most preferably, the composition includes about 0.1% of Byk 310®.

The composition 14 includes from about 0.25% to about 10% by weight of an anti-sag agent, based upon the total weight of the composition. In one embodiment, the composition includes about 2% of an anti-sag agent. As used herein, "anti-sag agent" means an anti-sag rheology modifier. Preferably, the anti-sag agent is a high hydroxy-containing compound. A suitable commercially available product is Byk 405® (Byk Chemie; Wallingford, Conn.). Most preferably, the composition includes about 2% of Byk 405®.

The composition 14 includes from about 0.05% to about 5% by weight of a defoamer, based upon the total weight of the composition. In one embodiment, the composition includes about 0.3% of a defoamer. As used herein, "defoamer" means a foam destroying agent. Preferably, the defoamer is a siloxane. More preferably, the siloxane is methyl alkyl polysiloxane. A suitable commercially available product is Byk 077® (Byk Chemie; Wallingford, Conn.). If bubbles are permitted to form at any time during the application, curing or cooling process, such bubbles may produce bare spots where the coating is not present on the substrate.

The composition 14 is produced by mixing and stirring the components together at ambient conditions to form a liquid composition. The composition 14 can be applied to the carbon steel substrate 12 in any suitable manner. In one embodiment, the composition 14 is applied by dipping the substrate 12 into the liquid composition 14 at a temperature of about 60° F. to about 150° F., preferably about 100° F., for a period of at least about 10 seconds, preferably about 10 seconds to about 120 seconds. When the substrate 12 is dipped in this manner and removed from the composition 14, a continuous liquid coating of the composition 14 adheres to the surfaces and edges of the substrate 12. The composition 14 is stable in the liquid phase and so can be applied by dipping the substrate therein in a high rate production process. The composition 14 includes substantially no volatile organic compounds, and thus does not emit such compounds into the air. The composition 14 also includes substantially no heavy metals.

The coated substrate is heated at an elevated temperature to cure the composition 14. For example, the coated substrate can be heated at a temperature of at least about 250° F. for a period of about 30 minutes, or at a temperature of at least about 350° F. for a period of about 15 minutes. Thus, the coated member 10 includes the substrate 12 of carbon steel and an outer coating of the cured composition 14. The cured composition includes a reaction product provided by thermally curing the composition. The coating has a thickness of only about 1–2 mils, and thus requires less material to form a suitable coating than would a wax-based composition.

The coating is resistant to moisture, and thus prevents corrosion of the carbon steel substrate. The coating is hard and resistant to being scraped off the substrate. The coating also possesses sufficient impact resistance to withstand repeated impacts without chipping or cracking. The coating also is stable when exposed to elevated temperatures and different weather conditions.

The following example is offered to illustrate the utility of the invention, and is not to be construed as limiting the scope of the specification or claims.

EXAMPLE

A composition including about 64% of 3,4 epoxycyclohexymethyl-3,4 epoxycyclohexane-carboxylate, about 5% of Riechhold 8076 Fineclad® polyester powder, about 16% of polycaprolactone diol, about 0.3% of the diethylammonium salt of trifluoromethanesulfonic acid ($CF_3SO_3H \cdot HN(C_2H_5)_2$), about 2.1% of carbon black, about 9.7% of Ferrophos®, about 0.1% of Byk 310® flow agent, about 2% of Byk405® anti-sag agent, and about 0.3% of Byk077® defoamer was prepared by mixing and stirring the components together at ambient conditions to form a liquid composition. The composition was applied to a carbon steel substrate by dipping the substrate into the liquid composition. The composition was thermally cured by heating the coated substrate at about 350° F. for a period of about 15 minutes. The resultant coating of the cured composition had a thickness of only about 1–2 mils. The coating was resistant to moisture, hard, impact-resistant, and stable when exposed to a temperature of about 600° F. for a period of about 1 hour.

A coating composition in an alternative embodiment of the invention will now be described. The composition includes a cycloaliphatic epoxy compound, a functional polyol and a catalyst. The composition differs from the earlier-described composition 14 in that the composition does not include a polyester compound.

The composition includes from about 35% to about 80% by weight of a cycloaliphatic epoxy compound, based upon the total weight of the composition. In one embodiment, the composition includes about 64% of a cycloaliphatic epoxy compound. In one embodiment, the cycloaliphatic epoxy compound is 3,4 epoxycyclohexymethyl-3,4 epoxycyclohexane-carboxylate. A suitable commercially available product is ERL 4221 (Union Carbide; Danbury, Conn.). In other embodiments, different cycloaliphatic epoxy compounds can be used. Preferably, the composition includes about 64% of 3,4 epoxycyclohexymethyl-3,4 epoxycyclohexane-carboxylate.

The composition includes from about 5% to about 40% by weight of a functional polyol compound, based upon the total weight of the composition. In one embodiment, the composition includes about 16% of a functional polyol compound. Preferably, the functional polyol compound is di-functional or tri-functional. More preferably, the functional polyol compound is polycaprolactone diol. A suitable commercially available product is Tone-0201® (Union Carbide; Danbury, Conn.). More preferably, the composition includes about 16% of polycaprolactone diol.

The composition includes at least about 0.1% by weight of a catalyst, based upon the total weight of the composition. In one embodiment, the composition includes about 0.3% of a catalyst. Preferably, the catalyst is a triflic acid. More preferably, the triflic acid is the diethylammonium salt of trifluoromethanesulfonic acid ($CF_3SO_3H \cdot HN(C_2H_5)_2$). A suitable commercially available product is FC 520 (Minn. Mining and Manufacturing; Minneapolis, Minn.). Most preferably, the composition includes about 0.25% of the diethylammonium salt of trifluoromethanesulfonic acid ($CF_3SO_3H \cdot HN(C_2H_5)_2$). This amount of the diethylammonium salt of trifluoromethanesulfonic acid ($CF_3SO_3H \cdot HN(C_2H_5)_2$) provides the liquid composition with an extended potlife at ambient conditions of at least about 5 years or more. In one embodiment, the liquid composition has a potlife of at least about 10 years or more. In one embodiment, the liquid composition has a potlife of at least about 1 year or more. This amount of the diethylammonium salt of trifluoromethanesulfonic acid (CF$_3$SO$_3$H·HN(C$_2$H$_5$)$_2$, also provides the liquid composition with a suitably short curing period for use in a high rate production process. For example, the composition can be suitably cured in a period of about 5 minutes at 300° F., as further described below.

The composition can also include any suitable additives, such as, for example, one or more of the following: an adhesion promoter, pigment, a corrosion inhibitor, a flow agent, an anti-sag agent and a defoamer. The amounts and identities of the additives previously described with reference to the composition 14 are suitable for use in the composition.

In one formulation, the composition includes about 64% of 3,4 epoxycyclohexymethyl-3,4 epoxycyclohexane-carboxylate, about 16% of polycaprolactone diol and at least about 0.25% of the diethylammonium salt of trifluoromethanesulfonic acid (CF$_3$SO$_3$H·HN(C$_2$H$_5$)$_2$. In one formulation, the composition includes about 64% of 3,4 epoxycyclohexymethyl-3,4 epoxycyclohexanecarboxylate, about 16% of polycaprolactone diol, at least about 0.25% of the diethylammonium salt of trifluoromethanesulfonic acid (CF$_3$SO$_3$H·HN(C$_2$H$_5$)$_2$, and one or more additives selected from the following: an adhesion promoter, a pigment, a corrosion inhibitor, a flow agent, an anti-sag agent, and a defoamer. In one specific formulation, the composition includes about 64% of 3,4 epoxycyclohexymethyl-3,4 epoxycyclohexane-carboxylate, about 16% of polycaprolactone diol, at least about 0.25% of the diethylammonium salt of trifluoromethanesulfonic acid (CF$_3$SO$_3$H·HN(C$_2$H$_5$)$_2$, about 0.5% of an adhesion promoter, about 2.1% of a pigment, about 9.7% of a corrosion inhibitor, about 0.1% of a flow agent, about 2% of an anti-sag agent, and about 0.3% of a defoamer.

The composition is produced, in the same manner as the composition 14, by mixing and stirring the components together at ambient conditions to form a liquid composition. The resulting liquid composition has a viscosity of about 300 centipoise at 25° F. and ambient pressure. The viscosity of the liquid composition remains substantially the same at temperatures between at least about 50° F. or lower and about 100° F. or higher. Since the viscosity of the composition is relatively stable over this temperature range, substantially uniform coatings can be readily achieved even though ambient temperature and the temperature of the composition may fluctuate. Therefore, the composition can be contained in a simple open tank and provide substantially uniform coatings at varying ambient conditions. This eliminates any need for handling equipment such as chillers or heating apparatus for the tank. The temperature of the substrate can also vary over a broad range and provide a suitable coating.

The liquid composition can be applied to the carbon steel substrate in any suitable manner. In one embodiment, the substrate is dipped into the liquid composition for a short period and thereafter withdrawn from the liquid composition to leave a continuous liquid coating of the composition on the substrate. The length of the dipping period can vary over a broad range and provide suitable results. For example, the substrate usually can be dipped into the liquid composition and thereafter immediately withdrawn and provide a suitable coating. Longer dipping periods can also provide suitable results. For example, when an assembled motor vehicle frame is to be coated, the assembled motor vehicle frame typically is supported by a conveyor and pulled through a 50,000 gallon tank of the liquid composition. In this example, the length of the dipping period is established by the movement of the conveyor, and the frame typically is dipped for a period of at least about 10 seconds, and typically for a period between about 10 seconds and about 120 seconds. When the substrate is dipped into and thereafter removed from the liquid composition, a very thin continuous liquid coating of the composition adheres to the surfaces and edges of the substrate. Preferably, any excess amount of the composition is permitted to drip from the substrate for a suitable period, and is collected and returned to the tank in order to minimize material cost.

The liquid composition is cured in a suitable manner. In one embodiment, the composition is cured by heating the coated substrate at an elevated temperature to cure the composition. The curing temperature and period can vary over a broad range. In one embodiment, the coated substrate is heated at a temperature of at least about 250° F. for a period of about 20 minutes to cure the composition. In one embodiment, the composition is cured at a temperature of at least about 300° F. for a period of about 5 minutes. Various properties, such as hardness and flexibility, of the coating of the cured composition will vary in relation to the curing temperature and period. The hardness of the coating typically is increased, and flexibility decreased, by curing at a higher temperature or for a longer period. For example, in one embodiment, the composition is cured at 375° F. for a period of about 18 minutes to provide a coating having a suitable combination of hardness and flexibility. The coated member after curing includes the substrate of carbon steel and a hard, moisture resistant outer coating of the cured composition. The cured composition includes a reaction product provided by curing the liquid composition.

The liquid composition is suitable for application by dipping the substrate therein in a high rate production process. In particular, in one embodiment the liquid composition has a potlife of at least about 1 year or more. In one embodiment, liquid composition has a potlife of at least about 5 years or more. In one embodiment, the liquid composition has a potlife of at least about 10 years or more. Additionally, the aging liquid composition will accept or incorporate replacement amounts of the same freshly prepared composition, and therefore can be replenished in order to maintain a constant volume of the composition in the dipping tank over this extended period.

The coating of the cured composition has a thickness of only about 1–2 mils, and thus only a minimal amount of the liquid composition is required to form the coating. The coating of the cured composition is uniform and is substantially free of agglomerates. The coating of the cured composition is resistant to moisture, is very hard and is resistant to being scraped off the substrate, is resistant to impact, and is stable when exposed to elevated temperatures and different weather conditions. The composition is "forgiving" in that a suitable coating of the cured composition forms even when the substrate includes oil spots, rust, weld seams, weld splatter and the like. Further, the liquid composition has a sufficiently low viscosity to flow between the overlapping portions of tightly joined frame members in an assembled motor vehicle frame, and thus forms a suitable coating over the facing surfaces of the joined members to prevent corrosion in the region of overlap.

A coating composition in another alternative embodiment (not shown) of the invention will now be described. The composition includes a cycloaliphatic epoxy compound, a functional polyol and a catalyst. The composition differs from the last-described composition only in the identity and amount of the catalyst. In this particular embodiment, the catalyst is a lithium salt. The amount of the lithium salt in the composition is sufficiently low to provide a potlife of at least about 1 year. In one embodiment, the composition has a potlife of at least about 5 years. In one embodiment, the composition has a potlife of at least about 10 years.

What is claimed is:

1. A method for producing a coated member including a substrate of corrodable material and a hard, moisture resistant coating on the substrate, comprising the steps of:

(a) preparing a supply of a liquid composition comprising a polyester in a concentration of about 5% to about 40% by weight of the composition, the polyester having hydroxy functional groups, a functional polyol compound in a concentration of about 5% to about 40% by weight of the composition, a cycloaliphatic epoxy compound in a concentration of about 35% to about 80% by weight of the composition, and a thermal curing catalyst in a concentration of about 0.1% to about 2% by weight of the composition, which catalyst is effective to cure the epoxy compound, polyester and functional polyol compound to form the coating;

(b) dipping the substrate into a liquid composition;

(c) withdrawing the substrate from the liquid composition so that a continuous coating of the liquid remains on the substrate; and (d) thermally curing the coating to form on the substrate a hard, moisture resistant coating of the cured composition, the cured coating comprising a reaction product of the cycloaliphatic epoxy compound, the functional polyol, and the polyester.

2. The method of claim 1, wherein the liquid composition contains substantially no volatile organic compounds.

3. The method of claim 1, wherein the functional polyol compound is selected from the group consisting of difunctional polyols, trifunctional polyols, and combinations thereof.

4. The method of claim 1, wherein the polyol is a polycaprolactone diol.

5. The method of claim 1, wherein the liquid composition further contains a corrosion inhibitor.

6. The method of claim 5, wherein the amount of the corrosion inhibitor is from about 5% to about 50% by weight, based upon the total weight of the composition.

7. The method of claim 6, wherein the corrosion inhibitor is selected from iron phosphide and iron silicide.

8. The method of claim 1, wherein the liquid composition further contains a pigment.

9. The method of claim 8, wherein the pigment is carbon black.

10. The method of claim 1, wherein the cycloaliphatic epoxy compound is 3,4 epoxycyclohexymethyl-3,4 epoxycyclohexane-carboxylate.

11. The method of claim 10, wherein the polyester compound is a mixture of polyester compounds having an average molecular weight of about 14,000.

12. The method of claim 11, wherein the catalyst is a triflic acid.

13. The method of claim 12, wherein the triflic acid is the diethylammonium salt of trifluoromethanesulfonic acid having the formula $CF_3SO_3H \cdot HN(C_2H_5)_2$.

14. The method of claim 1, wherein the polyester compound is a mixture of polyester compounds having an average molecular weight of about 14,000.

15. The method of claim 1, wherein the catalyst is a triflic acid.

16. The method of claim 15, wherein the triflic acid is the diethylammonium salt of trifluoromethanesulfonic acid having the formula $CF_3SO_3H \cdot HN(C_2H_5)_2$.

17. The method of claim 1, wherein the liquid composition further comprises an adhesion promoter in an amount effective for improving adhesion of the coating to the substrate.

18. The method of claim 1, wherein the liquid composition further comprises a titanate compound in an amount effective for improving adhesion of the coating to the substrate.

19. The method of claim 1, wherein the liquid composition further comprises an effective amount of a flow-enhancing agent.

20. The method of claim 1, wherein the liquid composition contains a siloxane compound in an amount effective as a flow improving agent.

21. The method of claim 1, further comprising storing the supply of the liquid composition for at least 1 year and repeating steps (b) to (d) during such period using the liquid composition.

22. The method of claim 1, further comprising storing the supply of the liquid composition in an open tank.

23. The method of claim 1, wherein the liquid composition in the dipping step (b) is at a temperature in a range of from about 60° F. to 150° F., the liquid composition being stable in this range, and step (b) lasts for at least about 10 seconds.

24. The method of claim 23, wherein step (d) further comprises heating the coated substrate to a temperature of at least about 250° F.

25. The method of claim 24, wherein step (a) further comprises adjusting the relative amounts of ingredients of the liquid composition so that the liquid composition cures during step (d) in about 20 minutes or less.

26. The method of claim 1, wherein the substrate is an automotive frame, and steps (b) and (c) further comprising transporting the automotive frame through an open tank of the liquid composition.

27. The method of claim 1, wherein the liquid composition further contains at least one of an adhesion promoter, a pigment, a flow-improving agent, an anti-sag agent, a defoamer, and combinations thereof.

28. The method of claim 1, wherein the amount of the catalyst is at least about 0.25 wt. %.

29. The method of claim 1, wherein step (a) further comprises adjusting the relative amounts of ingredients of the liquid composition so that the viscosity of the liquid composition remains substantially the same at temperatures in the range of 50° F. to 100° F.

30. The method of claim 1, wherein the liquid composition further comprises an effective amount of an anti-sag agent.

31. The method of claim 1, wherein the liquid composition contains an anti-sag agent in an amount effective of from about 0.25% to 10% by weight.

32. The method of claim 1, wherein the substrate comprises steel.

33. The method of claim 22, wherein the substrate is a motor vehicle frame member.

* * * * *